(12) United States Patent
Yuan et al.

(10) Patent No.: US 7,940,866 B2
(45) Date of Patent: May 10, 2011

(54) CORRELATION INTERVAL SYNCHRONIZATION APPARATUS AND METHOD

(75) Inventors: Xue Yuan, Hsin-Tien (TW); Min Lei, Hsin-Tien (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 713 days.

(21) Appl. No.: 11/835,019

(22) Filed: Aug. 7, 2007

(65) Prior Publication Data

US 2008/0310527 A1 Dec. 18, 2008

(30) Foreign Application Priority Data

Jun. 14, 2007 (CN) .......................... 2007 1 0108476

(51) Int. Cl.
*H03D 1/00* (2006.01)
*H04L 27/06* (2006.01)

(52) U.S. Cl. .......................... 375/343; 375/354; 375/364
(58) Field of Classification Search .................. 375/343, 375/354, 364; 370/203–211
See application file for complete search history.

(56) References Cited

U.S. PATENT DOCUMENTS

| 2001/0014116 A1* | 8/2001 | Saito et al. ..................... 375/148 |
| 2005/0063297 A1* | 3/2005 | Sakata et al. ................... 370/208 |
| 2006/0268673 A1* | 11/2006 | Roh et al. ....................... 370/203 |

* cited by examiner

*Primary Examiner* — Curtis B Odom
(74) *Attorney, Agent, or Firm* — Muncy, Geissler, Olds & Lowe, PLLC

(57) ABSTRACT

The present invention is directed to a correlation interval synchronization apparatus and method. Correlation is firstly performed on received data, followed by searching peaks in accordance with the output of the correlation. Subsequently, peak intervals are acquired according to the peaks, and the peak interval where the synchronization head position resides is determined. Finally, the synchronization head position is identified within the associated peak interval.

16 Claims, 3 Drawing Sheets

CORRELATION INTERVAL SYNCHRONIZATION APPARATUS AND METHOD

BACKGROUND OF THE INVENTION

1. Field of the Invention

The present invention generally relates to synchronization apparatus and method, and more particularly to correlation interval synchronization apparatus and method for an orthogonal frequency division multiplexing (OFDM) system.

2. Description of the Prior Art

Orthogonal frequency division multiplexing (OFDM) is a communication technique that applies frequency division and multi-carrier modulation, and is widely employed in a variety of digital communication systems, such as the Digital Multimedia Broadcasting (DMB) system or the Digital Audio Broadcasting (DAB) system. The DMB is a digital wireless communication system established on the DAB standard for transmitting multimedia data to a portable device, such as a cellular telephone. In the DMB system, the controllability of time offset of a frame is a critical factor for the efficiency of a receiver. In the conventional system, such as the system disclosed in "PC-based receiver for Eureka-147 digital audio broadcasting," IEEE Trans. on Broadcasting, vol. 47, No. 2, June 2001, by Jaehee Cho, a power algorithm (1) is used to estimate the time offset:

$$\tau = \operatorname*{MAX}_{n} \frac{\text{Energy}[iq_n, iq_{n+W}]}{\text{Energy}[iq_{n+W}, iq_{n+2W}]} + W \tag{1}$$

where W is the operation window, $iq_i$ is the i-th output of demodulation (such as I/Q demodulation), and Energy[a,b] denotes the total energy within the interval enclosed by a and b.

The conventional system requires time-consuming operations. Take the algorithm (1) for example, as substantial time is consumed in the division operations, efficient frame synchronization becomes impossible. Accordingly, a need has arisen to propose a synchronization apparatus and method that could simplify the operations, make real-time operation suitable for application specific integrated circuits (ASICs), and improve synchronization accuracy.

SUMMARY OF THE INVENTION

In view of the foregoing, it is an object of the present invention to provide a correlation interval synchronization apparatus and method for acquiring synchronization head position of the transmission frame, and facilitating the frame synchronization at the receiver end.

It is another object of the present invention to provide a window shift method, which replaces conventional complex operation, reduces time consumed in the operation, and makes real-time operation suitable for the ASIC.

It is a further object of the present invention to provide an accuracy enhanced method for improving the synchronization accuracy.

According to the object, the present invention provides a correlation interval synchronization apparatus and method. In one method of the embodiments, correlation operation is firstly performed on received data, followed by searching for a number of peaks in accordance with the correlation value out of the correlation operation. A number of peak intervals are acquired in accordance with the peaks, and a peak interval where a synchronization head position resides is determined in accordance with length of the peak intervals. Finally, the synchronization head position is identified in accordance with the peak interval where the synchronization head position resides.

According to one apparatus of the embodiments, the correlation interval synchronization apparatus includes a correlation device, a peak search device, a peak interval determination device, and a synchronization head position identification device. The correlation device firstly performs correlation operation on received data, followed by searching for a number of peaks by the peak search device in accordance with correlation value out of the correlation device. The peak interval determination device acquires a number of peak intervals in accordance with the peaks, and determines a peak interval where a synchronization head position resides in accordance with length of the peak intervals. The synchronization head position identification device finally identifies the synchronization head position in accordance with the peak interval where the synchronization head position resides.

DETAILED DESCRIPTION OF THE INVENTION

Figure 1:
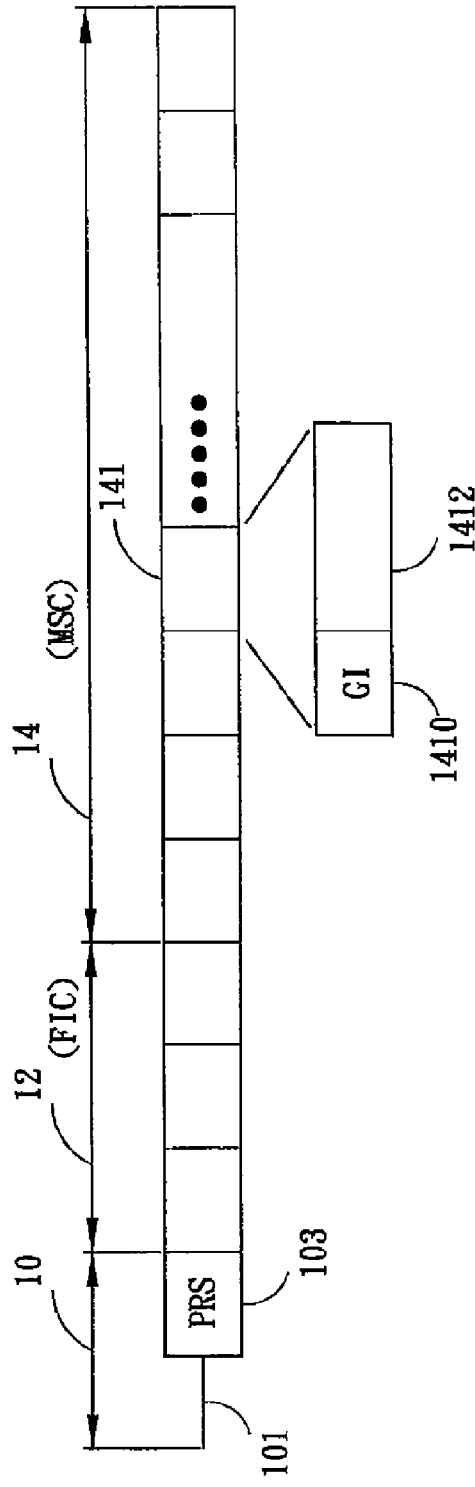
FIG. 1 schematically shows a transmission frame of a Terrestrial Digital Multimedia Broadcasting (TDMB) system or a Digital Audio Broadcasting (DAB) system.

FIG. 1 schematically shows a transmission frame of a Terrestrial Digital Multimedia Broadcasting (TDMB) system or a Digital Audio Broadcasting (DAB) system, which applies orthogonal frequency division multiplexing (OFDM) technique according to one embodiment of the present invention. The DAB/TDMB transmission frame includes a synchronization channel 10, a fast information channel (FTC) 12, and a main service channel (MSC) 14. Specifically, the synchronization channel 10 includes a null symbol 101 and a phase reference symbol (PRS) 103. The null symbol 101 has emitted with energy less than other symbols of the transmission frame or even with no energy, and may be used for synchronization purpose in the embodiment. The phase reference symbol 103 is used as a reference for demodulation of, for example, differential quadrature phase shift keying (DQPSK). The fast information channel 12 includes control information, which defines the sequence and the length (or size) of symbols in the main service channel 14. The main service channel 14 includes a number of symbols 141 for storing data respectively. Each symbol 141 of the main service channel 14 (or the symbol of the fast information channel 12) further includes a guard interval (GI) 1410 and a useful part 1412, In the DAB/TDMB system, the guard interval 1410 conforms to the cyclic prefix (CP) format, in which the corresponding later part of a previous symbol 141 is copied to be the content of the guard interval 1410. For example, last quarter of the previous useful part 1412 is copied as the guard interval 1410 in Eureka 147 DAB system. It is appreciated by a person skilled in the art that other cyclic extension, such as the cyclic suffix, or other formats may be adapted as well. The transmission frame of FIG. 1 is exemplified for one of various modes in DAB/TDMB system, and a person skilled in the art knows that transmission frames for other modes have some modifications. Although the DAB/TDMB system is illustrated in the embodiment, the present invention is well adaptable to other, either existing or future, OFDM systems, such as Digital Video Broadcasting (DVB) systems or equivalent communication systems.

Figure 2:
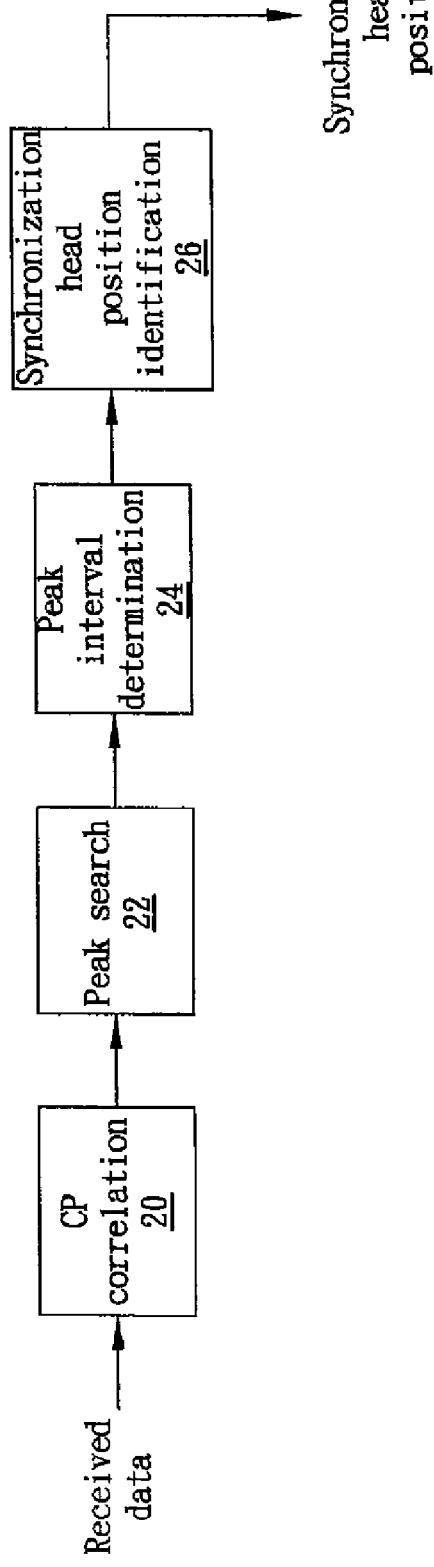
FIG. 2 illustrates apparatus and method of correlation interval synchronization according to one embodiment of the present invention.
Figure 3:
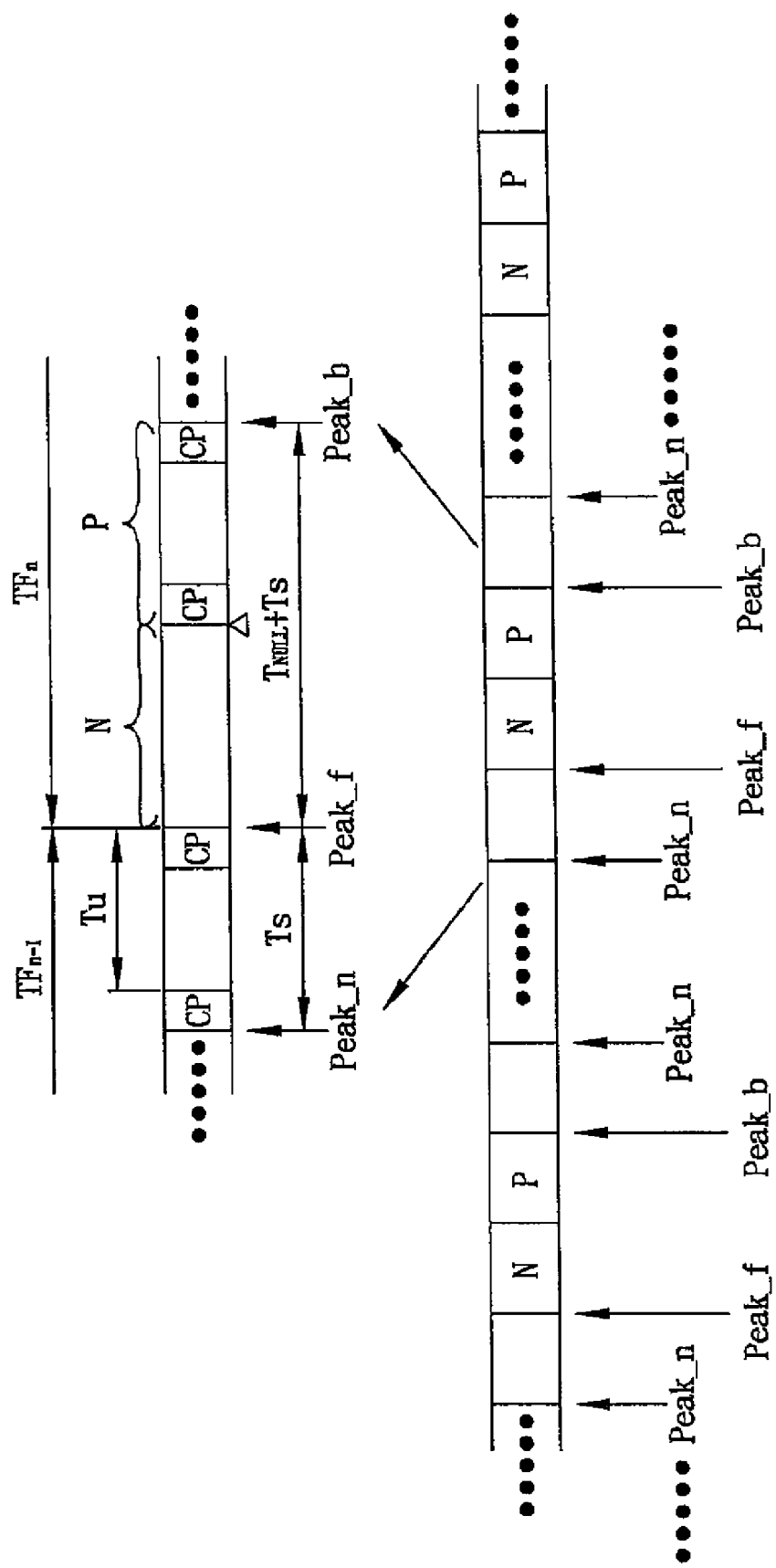
FIG. 3 illustrates a number of transmission frames according to the correlation interval synchronization of the present embodiment.

FIG. 2 illustrates apparatus and method of correlation interval synchronization according to one embodiment of the present invention, for acquiring synchronization head position of the transmission frame to accomplish the frame synchronization at the receiver end. The blocks 20-26 represent steps or functional blocks, which can be implemented in software or hardware or their combination, and can be embodied in application specific integrated circuits (ASICs). FIG. 3 illustrates a number of transmission frames associated with the correlation interval synchronization of the present embodiment. The operation steps/functional blocks and associated principles are generally explained referring to FIG. 2 and FIG. 3, and thereafter steps/functional blocks are respectively discussed in details. Firstly, CP correlation (block 20) is performed on received data, thereby obtaining CP correlation data or correlation value. As the correlation is one of usual operations in the DAB/TDMB system, such as in mode detection or fractional frequency offset (FFO), the operation result of the CP correlation (block 20) of the embodiment may be shared with other portions of the receiver without extra burden.

Subsequently, peaks are detected or searched (block 22) according to the correlation data or value out of the CP correlation (block 20). As illustrated in FIG. 3, in addition to the searched peaks (Peak_n) occurred at each (regular) symbol of the main service channel 14 or the fast information channel 12, a forward peak (Peak_f) occurs at the front end of the null symbol N, and a backward peak (Peak_b) occurs at the rear end of the phase reference symbol P.

Peak intervals are then acquired (block 24) according to the searched peaks in the block 22. As illustrated in FIG. 3, the peak interval between the peaks (Peak_n) at the ends of a regular symbol 141 has a duration or a distance Ts equals to the length of the regular symbol 141, which includes the guard interval 1410 and the useful part 1412 Tu. The peak interval between the forward peak (Peak_f) and the backward peak (Peak_b) has a distance equal to the length sum of the null symbol Tnull and the phase reference symbol Ts (that is, Tnull+Ts). For the reason that the distance of the peak interval (Tnull+Ts) between the forward peak (Peak_f) and the backward peak (Peak_b) is distinct and different from the peak interval Ts of the regular symbol, the forward peak (Peak_f) is thus determined and found at the front end of the null symbol N, and the backward peak (Peak_b) is then determined at the rear end of the phase reference symbol P.

Finally, the synchronization head position of the transmission frame is identified (block 26) according to peak interval between the forward peak (Peak_f) and the backward peak (Peak_b). In the embodiment, the synchronization head position is assigned at the front end of the phase reference symbol P. Equivalently speaking, the synchronization head position is identified by moving backward a distance (Ts−1) from the backward peak (Peak_b), expressed as L(Peak_b)−Ts+1, where L(Peak_b) denotes the position of the backward peak (Peak_b) of the phase reference symbol P.

The present embodiment not only discloses correlation interval synchronization apparatus and method for acquiring the synchronization head position of a transmission frame to accomplish the frame synchronization at the receiver end, but also proposes some simplified operations to substitute conventional ones (such as formula (1)), thereby reducing time consumed in the operations, and making real-time operation suitable for the ASIC. The present embodiment further provides accuracy enhanced method for improving synchronization accuracy.

CP Correlation (Block 20)

First of all, a time offset $\hat{\tau}$ is estimated according to formula (2):

$$\hat{\tau} = \underset{\tau}{\operatorname{argmax}} \left\{ \sum_{n=\tau-(N_g-1)}^{\tau} |y_n \times y_{n-N}^*| \middle/ \sum_{n=\tau-(N_g-1)}^{\tau} y_n \times y_{n-N}^* \right\} \quad (2)$$

where y is the received data, "*" denotes complex conjugate operation, and $N_g$ denotes the length of the guard interval.

The formula (2) can be preferably replaced with iterative formulas (3)-(4) to obtain CP correlation $C(k_0)$ and signal power $P(k_0)$:

$$C(k_0) = \sum_{n=k_0-(N_g-1)}^{k_0} y_n \times y_{n-N}^* \quad (3)$$

$$P(k_0) = \sum_{n=k_0-(N_g-1)}^{k_0} |y_n|^2 \quad (4)$$

The formula (2) or the formulas (3)-(4) can be further replaced with formula (5) to simplify its operation:

$$C(k_0+1) = C(k_0) - y_{k_0-(N_g-1)} y_{k_0-(N_g-1)-N}^* + y_{k_0+1} y_{k_0+1-N}^*$$

$$P(k_0+1) = P(k_0) - |y_{k_0-1}|^2 + |y_{k_0+1}|^2 \quad (5)$$

Peak Search (Block 22)

In this step/functional block 22, peaks are searched for according to the correlation data or value out of the previous CP correlation (block 20). According to the embodiment, algorithm (6) is utilized to determine the value and the position of the peaks:

$$CA(\tau) = \frac{C(\tau)}{N_g} \text{(complex)}, \quad (6)$$

$$PA(\tau) = \frac{P(\tau)}{N_g} \text{(real)},$$

if $(PA(\tau) > \text{normalized threshold})$ $$Z(\tau) = \frac{|CA(\tau)|}{PA(\tau)} \text{ else}$$

$$Z(\tau) = |CA(\tau)|$$

$$\hat{\tau} = \underset{r}{\operatorname{argmax}}(Z(\tau))$$

if $(Z(\hat{\tau}) > \text{preset threshold})$ it is a peak;

else it isn't a peak;

Specifically, in the algorithm (6), before the peaks are searched, signal power $PA(\tau)$ is compared with a predetermined normalized threshold, followed by normalizing correlation value CA(τ) in order to obtain a normalized correlation value Z(τ). The purpose of comparing the signal power PA(τ) with the predetermined normalized threshold is to prevent the occurrence of improper peaks. For example, as the energy of the null symbol N is too small, directly normalizing the correlation values in the null symbol without firstly making power comparison will result in improper peaks. After the normalization, the validity of the peaks is determined according a predetermined preset threshold. In other words, peaks are determined to be valid only when the normalized correlation value Z(τ) is greater than the preset threshold.

Due to the time-consuming division operation in obtaining the normalized correlation value Z(τ), another embodiment of the present invention uses the algorithm (7)-(9) instead to simplify and replace the algorithm (6). It is respectfully noted that (8) concerns window selection, also called window shift method, which is one of the features of the present invention, and will be discussed in details later. As the size of the selected window is Ts, and the signal fading is negligible within such window size, the normalization may therefore be omitted. By way of using this window shift method, the search logic could be simplified, and the operation complexity and associated memory requirement could be dramatically reduced.

$$CA(\tau) = \frac{C(\tau)}{N_g}, \text{ (complex) } PA(\tau) = \frac{P(\tau)}{N_g}, \text{ (real)} \quad (7)$$

$$CS(\tau) = \text{Real}^2(CA(\tau)) + \text{Imag}^2(CA(\tau)),$$

enter selection in one window, $\hat{\tau} = \arg\max_\tau (CS(\tau))$ (8)

```
if (PA(τ̂)>normalized threshold)
{
    if (CS(τ̂)>(PA(τ̂)×preset threshold)²)
        it is a peak;
    else                                              (9)
        it isn't a peak;
}
else
    it isn't a peak;
```

According to another embodiment, algorithm (7)-(9) could be replaced with algorithm (11)-(12) to simplify operations. Specifically, complex number multiplication in (7) could be omitted by replacing the square operation in (7) with the absolute operation in (10); and real number multiplication in (9) could be omitted by replacing (9) with (12). Consequently, a small number of adders, multipliers, comparators, and registers are enough to accomplish the algorithm (10)-(12) in hardware circuitry, such as ASIC.

$$CA(\tau) = \frac{C(\tau)}{N_g}, \text{ (complex) } PA(\tau) = \frac{P(\tau)}{N_g}, \text{ (real)} \quad (10)$$

$$CS\_M(\tau) = |\text{Real}(CA(\tau))| + |\text{Imag}(CA(\tau))|,$$

enter selection in one window, $\hat{\tau} = \arg\max_\tau (CS\_M(\tau))$ (11)

```
if (PA(τ̂)>normalized threshold)
{
    if (CS_M(τ̂)>PA(τ̂)×preset threshold)
        it is a peak;
```

```
    else                                              (12)
        it isn't a peak;
}
else
    it isn't a peak;
```

The window shift method employed in either algorithm (7)-(9) or algorithm (10)-(12) is capable of controlling the position of the window such that the peak could occur approximately at the center of the window, thereby preventing interference due to adjacent peaks. Accordingly, for every correlation value CS_M(τ), normalization of the correlated signal power becomes unnecessary. For example, no normalization is necessary for CS_M(τ) in the selection window in (11), compared to the normalization of dividing by PA(τ) in (6).

Figure 4:
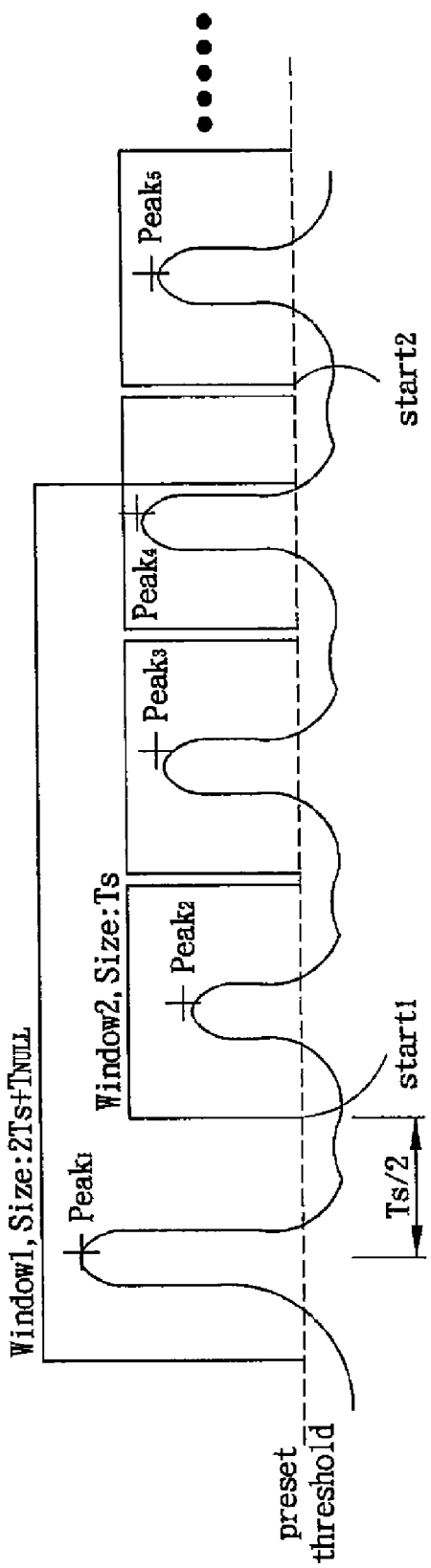
FIG. 4 illustrates one example of window shift method.

In the window shift method of the embodiment, a window 1 having a size of (2Ts+Tnull) is firstly used to ensure that at least one peak could occur even when the window involves the null symbol, as illustrated in FIG. 4. Assume the first peak occurs at $N_{\tau 0}$, and the size of window 2 (and the other window 2 after that) is set to be Ts, expressed as $$\left[N_{TO} + \frac{T_s}{2} + (n+x)T_s, N_{TO} + \frac{T_s}{2} + (n+x+1)T_s\right], n = 0, 1, 2 \ldots$$

where adjustment variable x is selected to prevent overlap of the window 1 and the window 2, and thus to avoid storing the window 1's data. As illustrated in FIG. 4, the first window 2 beginning at (start1) through the third window 2 overlap the window 1. If the adjustment variable x is set to 3, the window 2 beginning at (start2) is selected as the first window 2. The adjustment variable x could be determined as follows:

$$\text{mod}(\text{index\_peak, Len\_Win1}) + \frac{T_S}{2} + xT_S > \text{Len\_Win1}, \quad (13)$$

$$\text{Len\_Win1} - \frac{T_S}{2} - \text{mod}(\text{index\_peak, Len\_Win1}) < xT_S,$$

$$\text{Len\_Win1} = 2T_S + T_{NULL},$$

$$x = \text{ceil}\left[\frac{1}{T_S} \times (1.5T_S + T_{NULL} - \text{mod}(\text{index\_peak, Len\_Win1}))\right],$$

$$x \in \{0, 1, 2, 3\}$$

where index_peak denotes the sequence of data samples, mod denotes modulus operation, ceil is a round fraction up operation, index_peak is the position of the peak, and Len_Win1 is the size of window 1.

As the null symbol size Tnull is distinct from the regular symbol size Ts (in the embodiment, Tnull is greater than Ts), the peak will drift towards the right direction with interval (Tnull−Ts) from the center after the window passes the null symbol. In order to overcome this situation, window 2 should be periodically preset by waiting a period approximately equal to the interval (Tnull−Ts).

After the block 22 is finished, peaks are obtained as shown in FIG. 3, in which the peak (Peak_n) occurs at each (regular) symbol of the main service channel 14 or the symbol of the fast information channel 12, the forward peak (Peak_f) occurs at the front end of the null symbol 101, and the backward peak (Peak_b) occurs at the rear end of the phase reference symbol 103.

Peak Interval Determination (24)

Peak intervals are then acquired (block 24) according to the peaks searched in the block 22. As illustrated in FIG. 3, when a peak interval has a size of (Tnull+Ts±tolerance_sample), the forward peak (Peak_f) is determined as the front end of the null symbol N, and the backward peak (Peak_b) is determined as the rear end of the phase reference symbol P. The parameter tolerance_sample is the redundancy for synchronization accuracy. In the exemplary embodiment, the parameter tolerance_sample is set to be 40 samples in DAB/TDMB system, and the sampling frequency is 2.048 MHz.

Synchronization Head Position Identification (Block 26)

The front end of the phase reference symbol P is identified (block 26) according to peak interval between the forward peak (Peak_f) and the backward peak (Peak_b). In the embodiment, the synchronization head position is identified by moving backward a distance (Ts−1) from the backward peak (Peak_b), expressed as L(Peak_b)−Ts+1, where L(Peak_b) denotes the position of the backward peak (Peak_b) of the phase reference symbol P. It is appreciated that other position, such as the front end of the null symbol, could be instead assigned as the synchronization heads position.

An accuracy enhanced method is proposed in the embodiment to improve synchronization accuracy. After a number of successive peak intervals having size of about Ts are detected, the sequence of the last peak is recorded as (Num1) and the position of the last peak is recorded as (L1), the synchronization head position is accordingly determined as L1+[(sequence of the forward peak (Num_Peak_f)−Num1)*Ts+ Tnull. For avoiding the absence of peaks in the search process, because the lost detection will affect the application of accuracy enhanced method, an interval threshold determination (14) is performed:

$$\text{peak interval} > T_{NULL} + T_S + \text{Tolerance\_sample} \| (\text{peak interval} > 1.5 T_S \&\& \text{peak interval} < T_{NULL} + T_S - \text{Tolerance\_sample}) \quad (14)$$

where peak interval denotes the peak interval, Tnull denotes the size of the null symbol, Ts denotes the size of the regular symbol, Tolerance_sample is the accuracy tolerance, ∥ is logic OR operation, and && is logic AND operation.

When the condition of (14) has been met, it means that the lost detection of peaks occurs, then the accuracy enhanced method discussed above could not be used; otherwise, the accuracy enhanced method could be used to improve the synchronization accuracy. In the exemplary embodiment, a flag is set to be 1 when the condition of (14) has been met; and the flag is set to be 0 when successive peaks have been detected, followed by performing the accuracy enhanced method. In other words, when Peak_b has been found, the accuracy enhanced method should be used only when the flag is 0.

Figure 5:
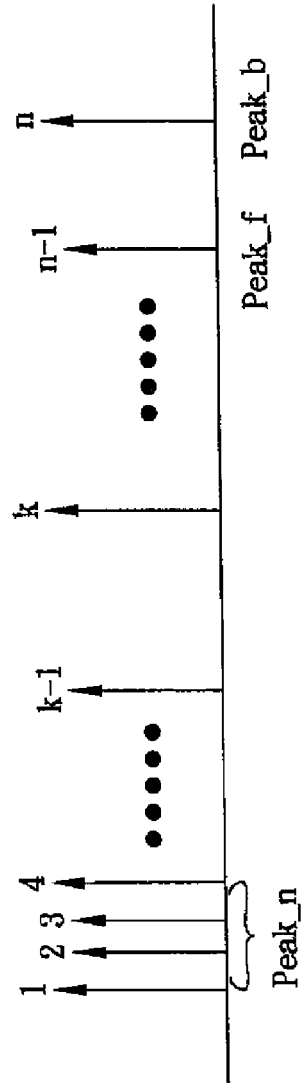
FIG. 5 illustrates one example of accuracy enhanced method.

Take FIG. 5 as example, after four successive peaks each having interval Ts are detected, the sequence of the last peak Num1(~4) and the sequence of the forward peak (n−1) are recorded, and if the lost detection of peaks doesn't occur, the synchronization head position is then determined as L1+(n−1−4)*Ts+Tnull, wherein L1 denotes the position of the fourth peak. But in FIG. 5, the lost detection occurs between the (k−1)-th peak and k-th peak, so the accuracy enhanced method can't be used.

According to the disclosed correlation interval synchronization apparatus and method, the synchronization head position of the transmission frame could be obtained for facilitating the frame synchronization at the receiver end. Moreover, some simplified operations are proposed to substitute complicated conventional operation, thereby reducing time consumed in the operations, and making real-time operation suitable for the ASIC. Further, the present embodiment further provides accuracy enhanced method for improving synchronization accuracy. For the exemplary embodiment of DAB/TDMB system, the probability of successful synchronization can reach above 99.9% for mode 1-4 and Urban (TU), Rural (RA), Single Frequency Networks (SFN) channels.

Although specific embodiments have been illustrated and described, it will be appreciated by those skilled in the art that various modifications may be made without departing from the scope of the present invention, which is intended to be limited solely by the appended claims.

What is claimed is:

1. A correlation interval synchronization apparatus, comprising:

correlation module for performing correlation operation on received data, wherein the received data comprises a plurality of frames, each of the frames including a null symbol, a phase reference symbol, and a plurality of regular symbols;

peak search module for searching for a plurality of peaks in accordance with correlation value of the correlation module;

peak interval determination module for acquiring a plurality of peak intervals in accordance with the peaks, and for determining a peak interval where a synchronization head position resides in accordance with length of the peak intervals; and synchronization head position identification module for identifying the synchronization head position in accordance with the peak interval where the synchronization head position resides;

wherein, the plurality of peaks searched by the peak search module comprise peaks (Peak_n) of the regular symbols, forward peaks (Peak_f) at front end of the null symbols, and backward peaks (Peak_b) at rear end of the phase reference symbols, wherein length of the peak interval between the forward peak (Peak_f) and the backward peak (Peak_b) is distinct from the length of the peak interval between the regular symbols, thereby determining the synchronization head position resides in the peak interval between the forward peak (Peak_f) and the backward peak (Peak_b).

2. The apparatus according to claim 1, wherein the synchronization head position is assigned at front end of the phase reference symbol, wherein the synchronization head position is identified by moving backward a distance (Ts−1) from the backward peak (Peak_b), where Ts is length of the phase reference symbol.

3. The apparatus according to claim 1, wherein the peak search module performs a window shift process, comprising:

utilizing a first window having a size enough to ensure that at least one peak could occur; and utilizing a plurality of second windows each having a size smaller than the size of the first window, wherein each of the peaks could be located approximately at center of each of the second windows, respectively, wherein the second windows do not overlap the first window.

4. The apparatus according to claim 1, wherein the peak interval determination module performs an accuracy enhanced process, comprising:

in response of a number of successive peak intervals having about same size are detected, recording a sequence (Num1) of the last peak and a position (L1) of the last peak; and determining the synchronization head position as L1+[(sequence of the forward peak (Num_Peak_f)−Num1)*Ts+Tnull, where Ts denotes length of the regular symbols, and Tnull denotes length of the null symbol.

5. The apparatus according to claim 1, wherein the correlation module obtains correlation $C(k_0)$ and signal power $P(k_0)$:

$$C(k_0) = \sum_{n=k_0-(N_g-1)}^{k_0} y_n \times y_{n-N}^*$$

$$P(k_0) = \sum_{n=k_0-(N_g-1)}^{k_0} |y_n|^2$$

where y is the received data, k0 is the phase reference symbol, Ng is the number of a guard interval symbols, N is the number of the regular symbols.

6. The apparatus according to claim 1, wherein the correlation module obtains correlation C and signal power P:

$$C(k_0+1)=C(k_0)-y_{k_0-(N_g-1)}y_{k_0-(N_g-1)}^*+y_{k_0+1}y_{k_0+1-N}^*$$

$$P(k_0+1)=P(k_0)-|y_{k_0-1}|^2+|y_{k_0+1}|^2$$

where y is the received data, k0 is the phase reference symbol, Ng is the number of a guard interval symbols, N is the number of the regular symbols.

7. The apparatus according to claim 3, wherein the first peak of the plurality of peaks occurs at $N_{TO}$, and the size of each of the second windows is set to be Ts, expressed as $$\left[N_{TO} + \frac{T_s}{2} + (n+x)T_s \quad N_{TO} + \frac{T_s}{2} + (n+x+1)T_s\right],$$

$$n = 0, 1, 2 \ldots$$

where adjustment variable x is selected to prevent overlap of the first window and the second windows, wherein the adjustment variable x is determined as follows:

$$\text{mod}(\text{index\_peak}, \text{Len\_Win1}) + \frac{T_S}{2} + xT_S > \text{Len\_Win1},$$

$$\text{Len\_Win1} - \frac{T_S}{2} - \text{mod}(\text{index\_peak}, \text{Len\_Win1}) < xT_S,$$

$$\text{Len\_Win1} = 2T_S + T_{NULL},$$

$$x = \text{ceil}\left[\frac{1}{T_S} \times (1.5T_S + T_{NULL} - \text{mod}(\text{index\_peak}, \text{Len\_Win1}))\right],$$

$$x \in \{0, 1, 2, 3\}$$

where index_peak denotes sequence of data samples, mod denotes modulus operation, cell is a round fraction up operation, index_peak is the position of the peak, and Len_Win1 is the size of the first window, $T_{NULL}$ is the length of the null symbol.

8. The apparatus according to claim 4, when the following condition is not satisfied, the accuracy enhanced process is then performed:

peak interval>$T_{NULL}+T_S$+Tolerance_sample||(peak interval>1.5Ts&&peak interval<$T_{NULL}+T_S$−Tolerance_sample)

where peak interval denotes the peak interval, Tnull denotes size of the null symbol, Ts denotes size of the regular symbol, Tolerance_sample is accuracy tolerance, || is logic OR operation, and && is logic AND operation.

9. A correlation interval synchronization method, comprising:
   performing correlation operation on received data, wherein the received data comprises a plurality of frames, each of the frames including a null symbol, a phase reference symbol, and a plurality of regular symbols;
   searching for a plurality of peaks in accordance with correlation value of the correlation operation;
   acquiring a plurality of peak intervals in accordance with the peaks, and determining a peak interval where a synchronization head position resides in accordance with length of the peak intervals; and
   identifying the synchronization head position in accordance with the peak interval where the synchronization head position resides
   wherein, the plurality of peaks comprise peaks (Peak_n) of the regular symbols, forward peaks (Peak_f) at front end of the null symbols, and backward peaks (Peak_b) at rear end of the phase reference symbols, wherein length of the peak interval between the forward peak (Peak_f) and the backward peak (Peak_b) is distinct from length of the peak interval between the regular symbols, thereby determining the synchronization head position resides in the peak interval between the forward peak (Peak_f) and the backward peak (Peak_b).

10. The method according to claim 9, wherein the synchronization head position is assigned at front end of the phase reference symbol, wherein the synchronization head position is identified by moving backward a distance (Ts−1) from the backward peak (Peak_b), where Ts is length of the phase reference symbol.

11. The method according to claim 9, when searching for the peaks, further comprising a window shift process, comprising:
   utilizing a first window having a size enough to ensure that at least one peak could occur; and
   utilizing a plurality of second windows each having a size smaller than the size of the first window, wherein each of the peaks could be located approximately at center of each of the second windows, respectively, wherein the second windows do not overlap the first window.

12. The method according to claim 9, wherein the peak interval are acquired, further comprising performing an accuracy enhanced process, comprising:
   in response of a number of successive peak intervals having about same size are detected, recording a sequence (Num1) of the last peak and a position (L1) of the last peak; and
   determining the synchronization head position as L1+[(sequence of the forward peak (Num_Peak_f)−Num1)*Ts+Tnull, where Ts denotes length of the regular symbols, and Tnull denotes length of the null symbol.

13. The method according to claim 9, when the correlation operation is performed, obtains correlation $C(k_0)$ and signal power $P(k_0)$:

$$C(k_0) = \sum_{n=k_0-(N_g-1)}^{k_0} y_n \times y_{n-N}^*$$

-continued $$P(k_0) = \sum_{n=k_0-(N_g-1)}^{k_0} |y_n|^2$$

where y is the received data, k0 is the phase reference symbol, Ng is the number of a guard interval symbols, N is the number of the regular symbols.

14. The method according to claim 9, when the correlation operation is performed, obtains correlation C and signal power P:

$$C(k_0+1)=C(k_0)-y_{k_0-(N_g-1)}y_{k_0-(N_g-1)}^* + y_{k_0+1}y_{k_0+1-N}^*$$

$$P(k_0+1)=P(k_0)-|y_{k_0-1}|^2+|y_{k_0+1}|^2$$

where y is the received data, k0 is the phase reference symbol, Ng is the number of a guard interval symbols, N is the number of the regular symbols.

15. The method according to claim 11, wherein the first peak of the plurality of peaks occurs at $N_{TO}$, and the size of each of the second windows is set to be Ts, expressed as $$\left[ N_{TO} + \frac{T_s}{2} + (n+x)T_s \quad N_{TO} + \frac{T_s}{2} + (n+x+1)T_s \right],$$

$$n = 0, 1, 2 \ldots$$

where adjustment variable x is selected to prevent overlap of the first window and the second windows, wherein the adjustment variable x is determined as follows:

$$\text{mod}(\text{index\_peak, Len\_Win1}) + \frac{T_S}{2} + xT_S > \text{Len\_Win1},$$

$$\text{Len\_Win1} - \frac{T_S}{2} - \text{mod}(\text{index\_peak, Len\_Win1}) < xT_S,$$

$$\text{Len\_Win1} = 2T_S + T_{NULL},$$

$$x = \text{ceil}\left[ \frac{1}{T_S} \times (1.5T_S + T_{NULL} - \text{mod}(\text{index\_peak, Len\_Win1})) \right],$$

$$x \in \{0, 1, 2, 3\}$$

where index_peak denotes sequence of data samples, mod denotes modulus operation, ceil is a round fraction up operation, index_peak is the position of the peak, and Len_Win1 is the size of the first window, $T_{NULL}$ is the length of null symbol.

16. The method according to claim 12, when the following condition is not satisfied, the accuracy enhanced process is then performed:

peak interval>$T_{NULL}$+$T_S$+Tolerance_sample||(peak interval>1.5Ts&&peak interval<$T_{NULL}$+$T_S$−Tolerance_sample)

where peak interval denotes the peak interval, Tnull denotes size of the null symbol, Ts denotes size of the regular symbol, Tolerance_sample is accuracy tolerance, || is logic OR operation, and && is logic AND operation.

* * * * *